US012273171B2

United States Patent
Hao et al.

(10) Patent No.: US 12,273,171 B2
(45) Date of Patent: Apr. 8, 2025

(54) CSI REPORT CONFIGURATION WITH A CODEBOOK LIST

(71) Applicant: QUALCOMM Incorporated, San Diego, CA (US)

(72) Inventors: Chenxi Hao, Beijing (CN); Yu Zhang, Beijing (CN); Liangming Wu, Beijing (CN); Qiaoyu Li, Beijing (CN); Wanshi Chen, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 611 days.

(21) Appl. No.: 17/268,379

(22) PCT Filed: Sep. 14, 2018

(86) PCT No.: PCT/CN2018/105791
§ 371 (c)(1),
(2) Date: Feb. 12, 2021

(87) PCT Pub. No.: WO2020/051896
PCT Pub. Date: Mar. 19, 2020

(65) Prior Publication Data
US 2021/0320704 A1    Oct. 14, 2021

(51) Int. Cl.
*H04B 7/06*    (2006.01)
*H04B 7/0456*  (2017.01)
*H04L 5/00*    (2006.01)

(52) U.S. Cl.
CPC ......... *H04B 7/0626* (2013.01); *H04B 7/0456* (2013.01); *H04B 7/0632* (2013.01); *H04B 7/0639* (2013.01); *H04L 5/0051* (2013.01)

(58) Field of Classification Search
CPC .... H04B 7/024; H04B 7/0456; H04B 7/0469; H04B 7/0626; H04B 7/0632;
(Continued)

(56) References Cited

U.S. PATENT DOCUMENTS 8,976,770 B2 * 3/2015 Kang ................... H04W 72/04
370/338
9,999,074 B2 * 6/2018 Moon .................... H04B 7/06
(Continued)

FOREIGN PATENT DOCUMENTS

CN    103391154 A    11/2013
CN    105812033 A    7/2016
(Continued)

OTHER PUBLICATIONS

International Search Report and Written Opinion—PCT/CN2018/105791—ISA/EPO—Jun. 6, 2019.
(Continued)

*Primary Examiner* — Liton Miah
(74) *Attorney, Agent, or Firm* — Patterson & Sheridan LLP

(57) ABSTRACT

Certain aspects of the present disclosure provide techniques for a channel state information (CSI) report configuration with a codebook list, for example, for non-coherent joint transmission (NCJT). A method for wireless communication that can be performed by a user equipment (UE) includes receiving a CSI report configuration. The CSI report configuration is associated with one or more CSI reference signal (RS) resources. Each CSI-RS resource includes a set of ports or port groups. The UE receives a list of codebooks associated with the configuration. The UE determines at least one codebook, from the list of codebooks, to apply for one or more triggered CSI-RS resources.

18 Claims, 10 Drawing Sheets

(58) Field of Classification Search
CPC .... H04B 7/0639; H04B 7/0691; H04B 7/063; H04L 5/0051; H04L 5/005; H04L 5/0057
See application file for complete search history.

(56) References Cited

U.S. PATENT DOCUMENTS

| | | | | |
|---|---|---|---|---|
| 10,225,054 B2* | 3/2019 | Shin | ............... | H04B 7/0626 |
| 10,498,505 B2* | 12/2019 | Jin | ............... | H04B 7/0469 |
| 10,812,162 B2* | 10/2020 | Nam | ............... | H04B 7/0626 |
| 2013/0021926 A1* | 1/2013 | Geirhofer | ............ | H04L 5/0048 |
| | | | | 370/252 |
| 2014/0177744 A1 | 6/2014 | Krishnamurthy et al. | | |
| 2014/0241274 A1 | 8/2014 | Lee et al. | | |
| 2016/0182137 A1* | 6/2016 | Onggosanusi | ...... | H04B 7/0478 |
| | | | | 370/329 |
| 2016/0359538 A1* | 12/2016 | Onggosanusi | ...... | H04B 7/0478 |
| 2017/0180194 A1* | 6/2017 | Noh | ............... | H04B 7/0626 |
| 2018/0115357 A1* | 4/2018 | Park | ............... | H04L 5/0051 |
| 2018/0234154 A1* | 8/2018 | Chen | ............... | H04L 1/0026 |
| 2023/0140316 A1* | 5/2023 | Rahman | ............ | H04B 7/0482 |
| | | | | 370/252 |
| 2023/0254082 A1* | 8/2023 | Kwak | ............... | H04W 72/542 |
| | | | | 370/329 |

FOREIGN PATENT DOCUMENTS

| | | |
|---|---|---|
| CN | 106411374 A | 2/2017 |
| WO | 2016105120 A1 | 6/2016 |
| WO | 2018229078 A1 | 12/2018 |

OTHER PUBLICATIONS

Ericsson: "CSI Feedback for Multi-TRP", 3GPP TSG-RAN WG1 #91, 3GPP Draft, R1-1720974 CSI Feedback for Multi-TRP, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 27, 2017-Dec. 1, 2017, Nov. 18, 2017 (Nov. 18, 2017), XP051370340, 9 Pages, Retrieved from the Internet: URL: http://www.3gpp.org/ftp/tsg%5Fran/WG1%5FRL1/TSGR1%5F91/Docs/ [retrieved on Nov. 18, 2017] the whole document, Section 3.
Supplementary European Search Report—EP18933688—Search Authority—Munich—Mar. 29, 2022.

* cited by examiner

CSI REPORT CONFIGURATION WITH A CODEBOOK LIST

CROSS-REFERENCE TO RELATED APPLICATIONS

This application is a national stage application under 35 U.S.C. 371 of PCT/CN2018/105791, filed Sep. 14, 2018, which is incorporated herein by reference in its entirety.

INTRODUCTION

Field of the Disclosure

Aspects of the present disclosure relate to wireless communications, and more particularly, to techniques for a channel state information (CSI) report configuration with a codebook list, for example, for non-coherent joint transmission (NCJT).

DESCRIPTION OF RELATED ART

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, 5G NB, next generation NodeB (gNB or gNodeB), transmission reception point (TRP), etc.). A BS or DU may communicate with a set of UEs on downlink channels (e.g., for transmissions from a BS or DU to a UE) and uplink channels (e.g., for transmissions from a UE to BS or DU).

These multiple access technologies have been adopted in various telecommunication standards to provide a common protocol that enables different wireless devices to communicate on a municipal, national, regional, and even global level. NR (e.g., new radio or 5G) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communication by a user equipment (UE). The method generally includes receiving a channel state information (CSI) report configuration. The CSI report configuration is associated with one or more CSI reference signal (RS) resources. Each CSI-RS resource includes a set of ports or port groups. The method generally includes receiving a list of codebooks associated with the CSI report configuration. The method generally includes determining at least one codebook, from the list of codebooks, to apply for one or more triggered CSI-RS resources.

Certain aspects provide a method for wireless communication by a base station (BS). The method generally includes providing a UE with a CSI report configuration. The CSI report configuration is associated with one or more CSI-RS resources. Each CSI-RS resource includes a set of ports or port groups. The method generally includes providing the UE with a list of codebooks associated with the CSI report configuration.

Certain aspects provide an apparatus for wireless communication. The apparatus generally includes means for receiving a CSI report configuration. The CSI report configuration is associated with one or more CSI-RS resources. Each CSI-RS resource includes a set of ports or port groups. The apparatus generally includes means for receiving a list of codebooks associated with the CSI report configuration. The apparatus generally includes means for determining at least one codebook, from the list of codebooks, to apply for one or more triggered CSI-RS resources.

Certain aspects provide an apparatus for wireless communication by a BS. The apparatus generally includes means for providing a UE with a CSI report configuration. The CSI report configuration is associated with one or more CSI-RS resources. Each CSI-RS resource includes a set of ports or port groups. The apparatus generally includes means for providing the UE with a list of codebooks associated with the CSI report configuration.

Certain aspects provide an apparatus for wireless communication. The apparatus generally includes a receiver configured to receive a CSI report configuration. The CSI report configuration is associated with one or more CSI-RS resources. Each CSI-RS resource includes a set of ports or port groups. The receiver is further configured to receive a list of codebooks associated with the CSI report configuration. The apparatus generally includes at least one processor coupled with a memory and configured to determine at least one codebook, from the list of codebooks, to apply for one or more triggered CSI-RS resources.

Certain aspects provide an apparatus for wireless communication by a BS. The apparatus generally includes a transmitter configured to provide a UE with a CSI report configuration. The CSI report configuration is associated with one or more CSI-RS resources. Each CSI-RS resource includes a set of ports or port groups. The transmitter is further configured to provide the UE with a list of codebooks associated with the CSI report configuration.

Certain aspects provide a computer readable medium having computer executable code stored thereon for wireless communication. The computer readable medium generally includes code for receiving a CSI report configuration. The CSI report configuration is associated with one or more CSI-RS resources. Each CSI-RS resource includes a set of ports or port groups. The computer readable medium generally includes code for receiving a list of codebooks associated with the CSI report configuration. The computer readable medium generally includes code for determining at least one codebook, from the list of codebooks, to apply for one or more triggered CSI-RS resources.

Certain aspects provide a computer readable medium having computer executable code stored thereon for wireless communication by a BS. The computer readable medium generally includes code for providing a UE with a CSI report configuration. The CSI report configuration is associated with one or more CSI-RS resources. Each CSI-RS resource includes a set of ports or port groups. The computer readable medium generally includes code for providing the UE with a list of codebooks associated with the CSI report configuration.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
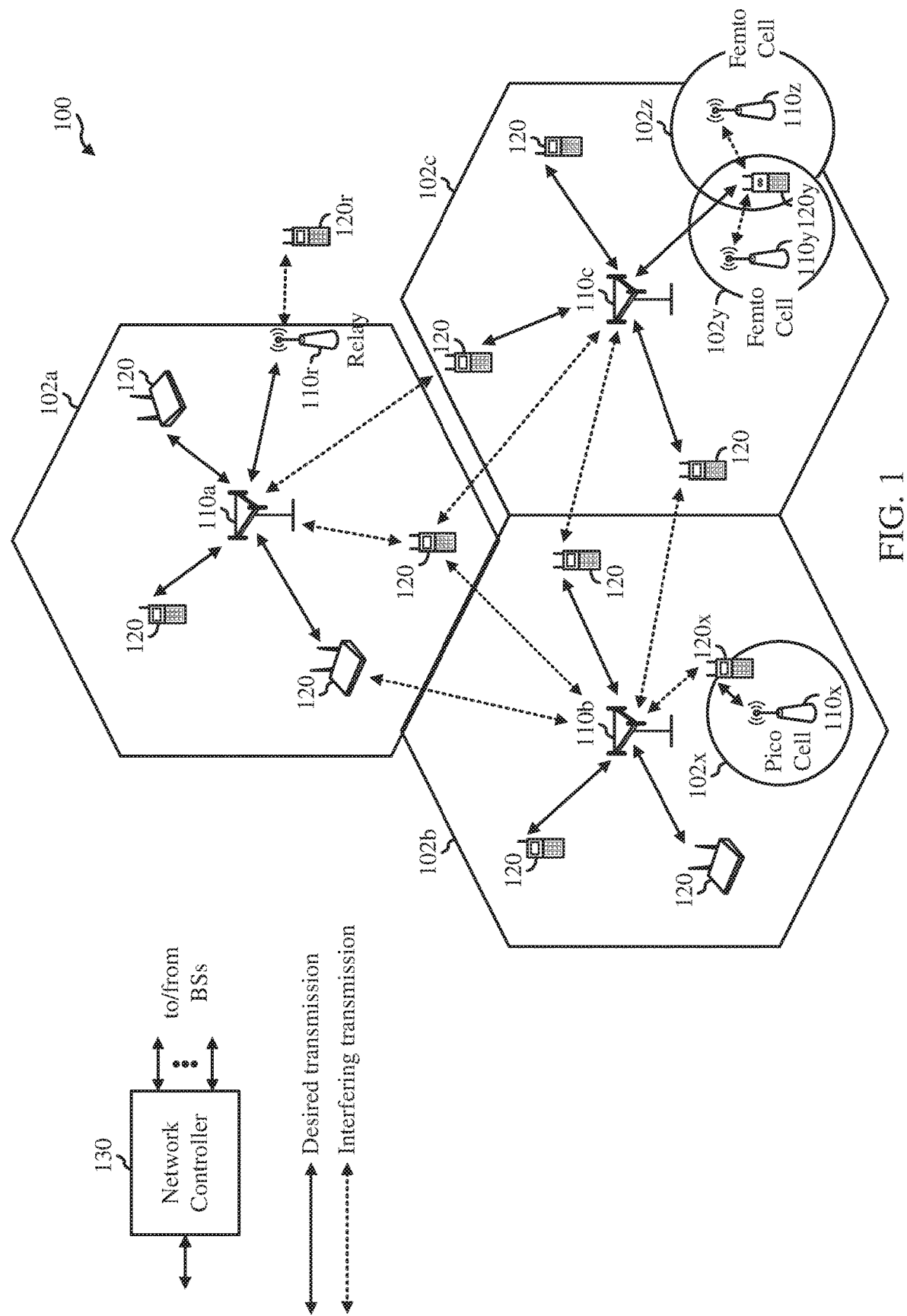
FIG. 1 is a block diagram conceptually illustrating an example telecommunications system, in accordance with certain aspects of the present disclosure.

Aspects of the present disclosure provide apparatus, methods, processing systems, and computer readable mediums for a channel state information (CSI) report configuration with a codebook list, for example, for non-coherent joint transmission (NCJT).

A CSI report configuration configures non-zero power (NZP) CSI reference signal (RS) resources for channel measurement. In certain systems, a CSI report configuration includes a single codebook that is applied to all NZP CSI-RS resources configured for the channel measurement. In certain systems, however, CSI reporting for multi-TRP (transmission reception point) transmissions, such as non-coherent joint transmission (NCJT) is desirable. To support CSI report for multi-TRP transmission, the CSI-RS of different TRPs (or different panels of a TRP) may be carried in different CSI-RS resources, or in different port groups of a CSI-RS resource. The number of ports in each CSI-RS resource or port group may be different.

Thus, multiple codebooks are desirable. Aspects of the present disclosure provide a CSI report configuration with a list of codebooks.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE. CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF), 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

FIG. 1 illustrates an example wireless communication network 100 in which aspects of the present disclosure may be performed. For example, the wireless communication network 100 may be a New Radio (NR) or 5G network. For example, a UE 120 may receive a channel state information (CSI) report configuration from a BS 110 in the wireless communication network 100. The CSI report configuration is associated with one or more CSI reference signal (RS) resources with each CSI-RS resource including a set of ports or port groups. The UE 120 also receives a list of codebooks associated with the CSI report configuration. The UE 120 determines at least one codebook, from the list of codebooks, to apply for one or more triggered CSI resources.

As illustrated in FIG. 1, the wireless communication network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a Node B (NB) and/or a NB subsystem serving this coverage area, depending on the context in which the term is used. In NR systems, the term "cell" and next generation NodeB (gNB or gNodeB), NR BS, 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases. NR or 5G RAT networks may be deployed.

A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless communication network 100 may be a heterogeneous network that includes BSs of different types. e.g., macro BS, pico BS, femto BS, relays, etc. These different types of BSs may have different transmit power levels, different coverage areas, and different impact on interference in the wireless communication network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a carriera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
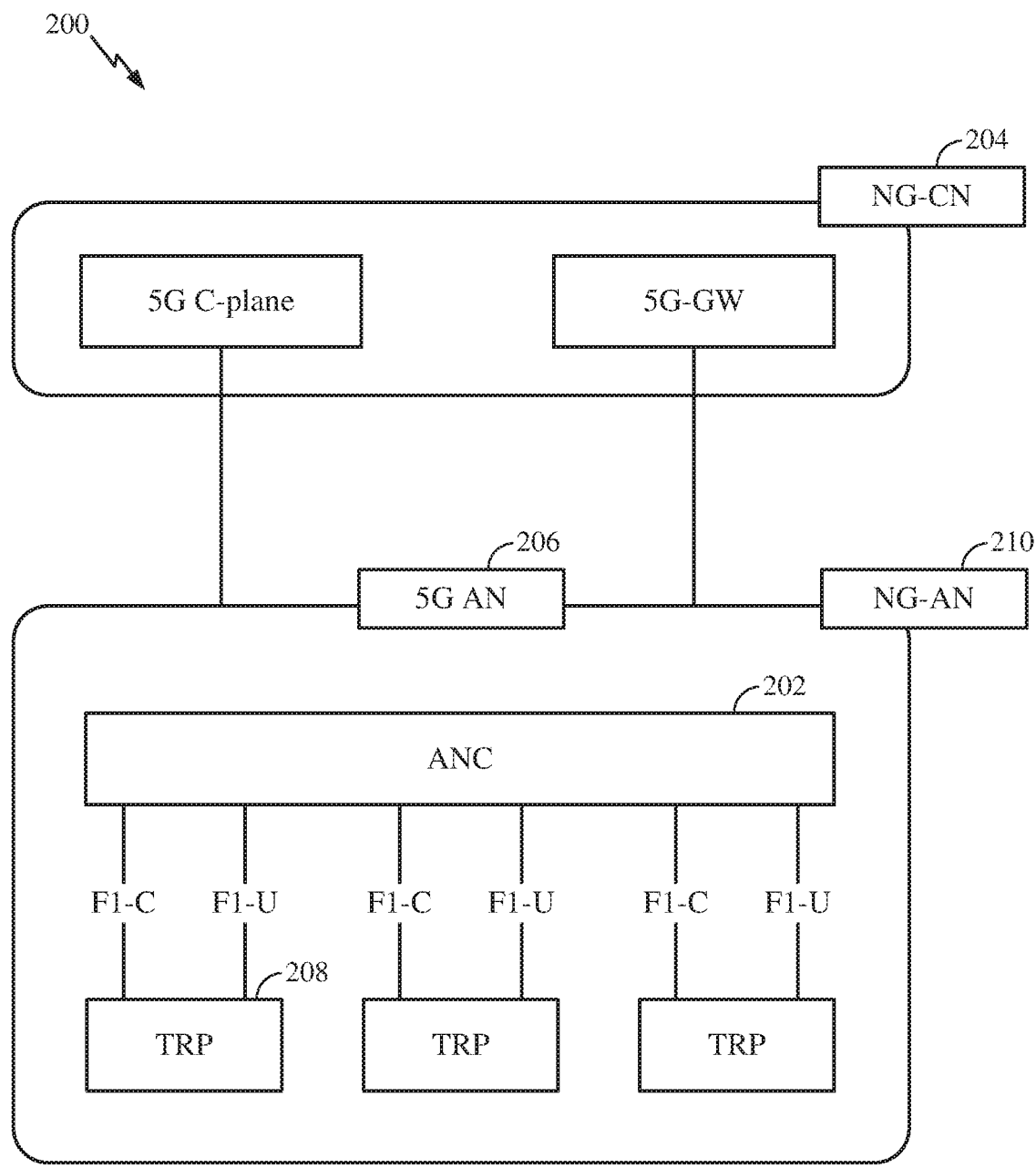
FIG. 2 is a block diagram illustrating an example logical architecture of a distributed radio access network (RAN), in accordance with certain aspects of the present disclosure.

FIG. 2 illustrates an example logical architecture of a distributed Radio Access Network (RAN) 200, which may be implemented in the wireless communication network 100 illustrated in FIG. 1. A 5G access node 206 may include an access node controller (ANC) 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more TRPs 208 (e.g., cells, BSs, gNBs, etc.).

The TRPs 208 may be a distributed unit (DU). TRPs 208 may be connected to a single ANC (e.g., ANC 202) or more than one ANC (not illustrated). For example, for RAN sharing, radio as a service (RaaS), and service specific AND deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support fronthauling solutions across different deployment types. For example, the logical architecture may be based on transmit network capabilities (e.g., bandwidth, latency, and/or jitter).

The logical architecture of distributed RAN 200 may share features and/or components with LTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
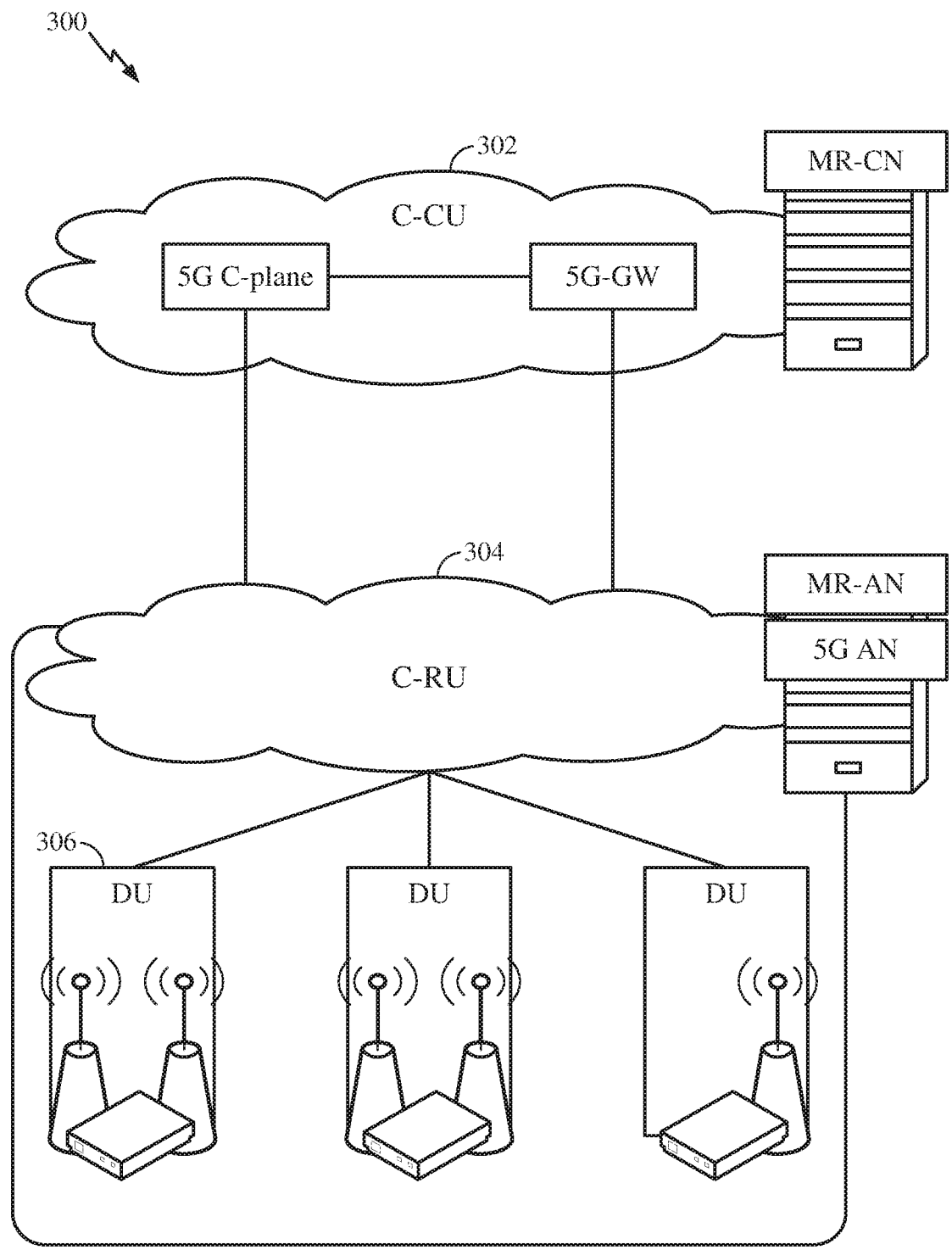
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
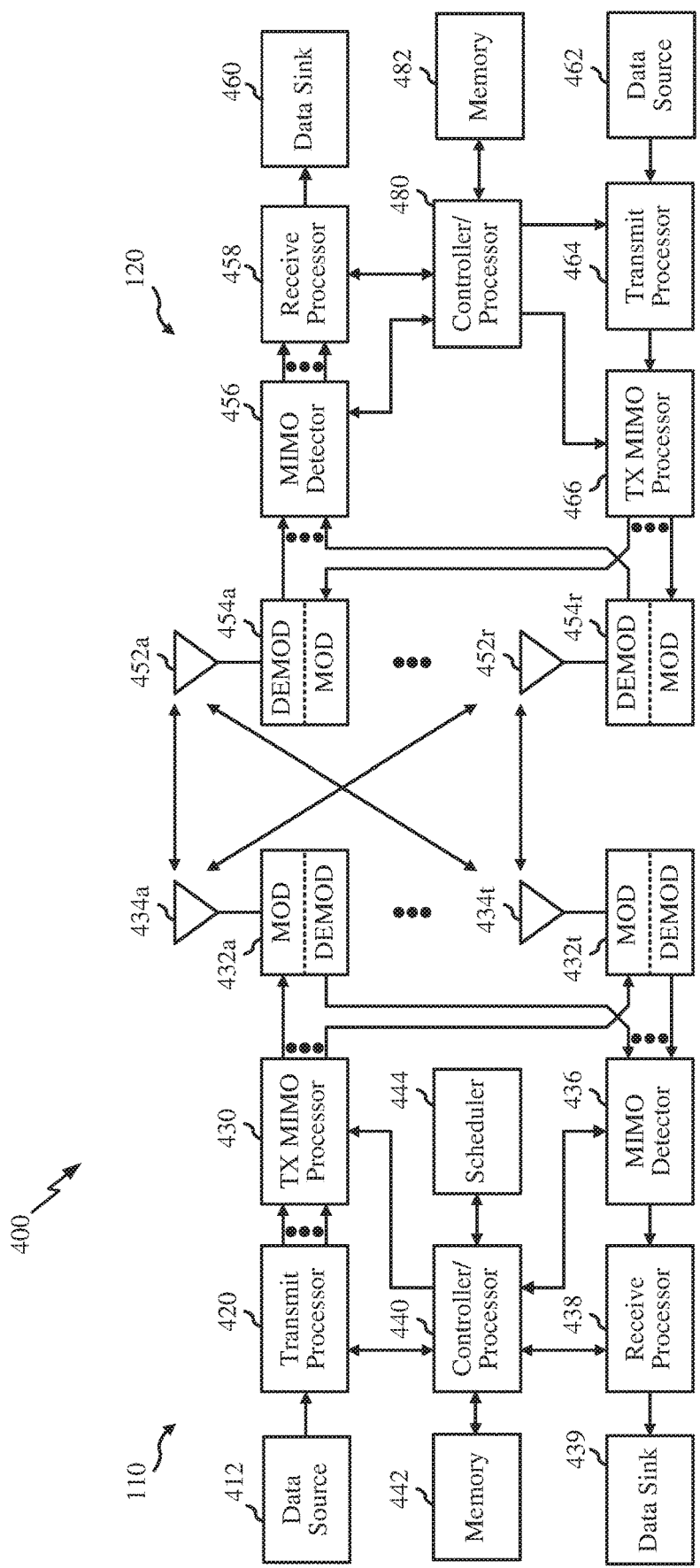
FIG. 4 is a block diagram conceptually illustrating a design of an example base station (BS) and user equipment (UE), in accordance with certain aspects of the present disclosure.

FIG. 4 illustrates example components of BS 110 and UE 120 (as depicted in FIG. 1), which may be used to implement aspects of the present disclosure. For example, antennas 452, processors 466, 458, 464, and/or controller/processor 480 of the UE 120 and/or antennas 434, processors 420, 430, 438, and/or controller/processor 440 of the BS 110 may be used to perform the various techniques and methods described herein a channel state information (CSI) report configuration with a codebook list, for example, for non-coherent joint transmission (NCJT)

At the BS 110, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) in transceivers 454a through 454r, respectively. Each demodulator 454 may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at UE 120, a transmit processor 464 may receive and process data (e.g., for the physical uplink shared channel (PUSCH)) from a data source 462 and control information (e.g., for the physical uplink control channel (PUCCH) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the BS 110 and the UE 120, respectively. The processor 440 and/or other processors and modules at the BS 110 may perform or direct the execution of processes for the techniques described herein. The memories 442 and 482 may store data and program codes for BS 110 and UE 120, respectively. A scheduler 444 may schedule UEs for data transmission on the downlink and/or uplink.

Figure 5:
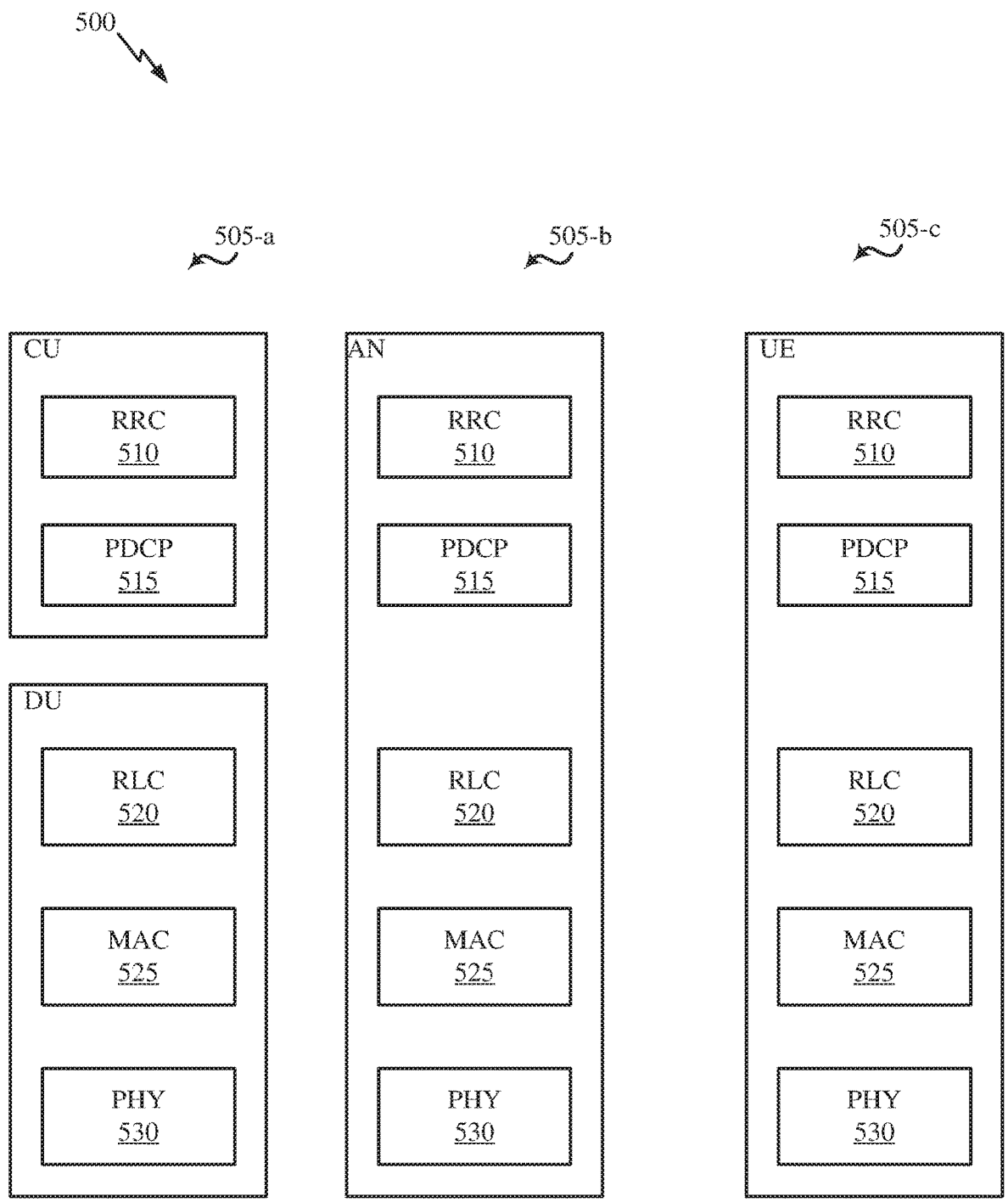
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a wireless communication system, such as a 5G system (e.g., a system that supports uplink-based mobility). Diagram 500 illustrates a communications protocol stack including a RRC layer 510, a PDCP layer 515, a RLC layer 520, a MAC layer 525, and a PHY layer 530. In various examples, the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device. In the second option, RRC layer 510, PDCP layer 515. RLC layer 520, MAC layer 525, and PHY layer 530 may each be implemented by the AN. The second option 505-b may be useful in, for example, a femto cell deployment.

Regardless of whether a network access device implements part or all of a protocol stack, a UE may implement an entire protocol stack as shown in 505-c (e.g., the RRC layer 510, the PDCP layer 515, the RLC layer 520, the MAC layer 525, and the PHY layer 530).

In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, ... slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 6:
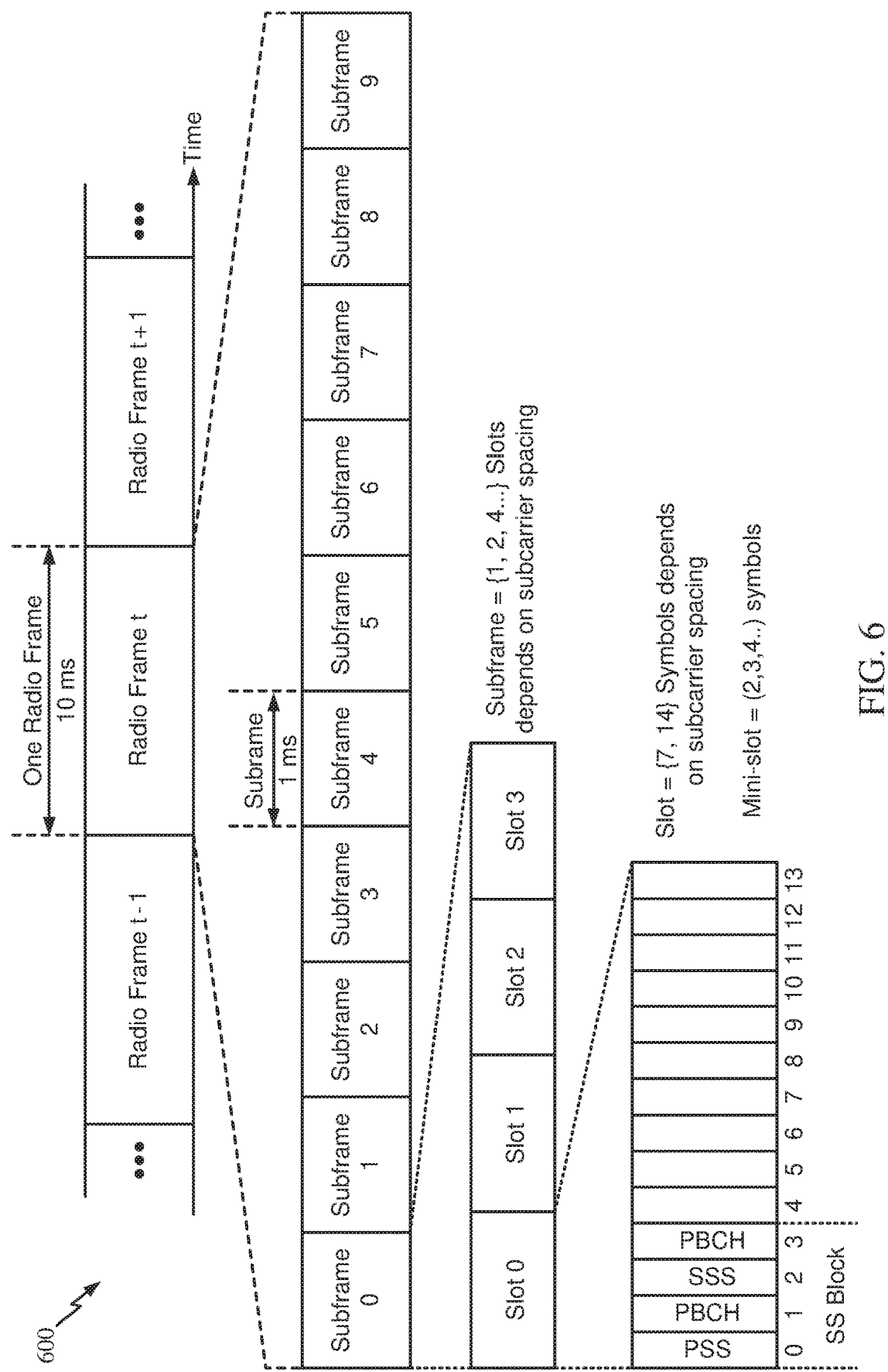
FIG. 6 illustrates an example of a frame format for a new radio (NR) system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SS block can be transmitted up to sixty-four times, for example, with up to sixty-four different beam directions for mmW. The up to sixty-four transmissions of the SS block are referred to as the SS burst set. SS blocks in an SS burst set are transmitted in the same frequency region, while SS blocks in different SS bursts sets can be transmitted at different frequency locations.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications. Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example CSI Report Configuration With A Codebook List

In certain wireless communication networks (e.g., new radio), non-coherent joint transmissions (NCJTs) may be used to provide multiple-input multiple-output (MIMO), multiple-user (MU) MIMO, and/or coordinated multi-point (CoMP) communications. The NCJTs may be from multiple transmission-reception points (multi-TRP), multiple panels (multi-panels) of a TRP, or a combination thereof. Coherent joint transmission requires synchronization among transmission reception points (TRPs). However, for distributed TRPs, the precoders cannot be jointly designed and, therefore, the TRPs are not synchronized. Instead, each TRP derives the precoder independently, without knowledge of the precoders used by the other TRPs. Thus, the joint transmission is non-coherent. Via NCJT. TRPs can transmit the same data to a UE to improve the transmission reliability/coverage and/or the TRPs can transmit different data streams to the UE to improve throughput.

CSI may refer to known channel properties of a communication link. The CSI may represent the combined effects of, for example, scattering, fading, and power decay with distance between a transmitter and receiver. Channel estimation using the pilots, such as CSI reference signals (CSI-RS), may be performed to determine these effects on the channel. CSI may be used to adapt transmissions based on the current channel conditions, which is useful for achieving reliable communication, in particular, with high data rates in multi-antenna systems. CSI is typically estimated at the receiver, quantized, and fed back to the transmitter.

The network (e.g., a base station (BS), may configure UEs for CSI reporting. For example, the BS configures the UE with a CSI report configuration (sometimes referred to as a 'CSI report setting') or with multiple CSI report configurations. The CSI report configuration may be provided to the UE via higher layer signaling, such as radio resource control (RRC) signaling. The CSI report configurations may be associated with CSI-RS resources used for channel measurement (CM), interference measurement (IM), or both. The CSI report configuration configures CSI-RS resources (sometimes referred to as the 'CSI-RS resource setting') for measurement. The CSI-RS resources provide the UE with the configuration of CSI-RS ports, or CSI-RS port groups, mapped to time and frequency resources (e.g., resource elements (REs)). CSI-RS resources can be zero power (ZP) or non-zero power (NZP) resources. At least one NZP CSI-RS resource may be configured for CM.

The CSI report configuration also configures the CSI parameters (sometimes referred to as quantities) to be reported. Three codebooks include Type I single panel. Type I multi-panel, and Type II single panel. Regardless which codebook is used, the CSI report may include a channel quality indicator (CQI), a precoding matrix indicator (PMI), a CSI-RS resource indicator (CRI), and/or a rank indicator (RI). The structure of the PMI may vary based on the codebook. For the Type I single panel codebook, the PMI consists of a Wi matrix (e.g., subest of beams) and a W2 matrix (e.g., phase for cross polarization combination and beam selection). For the Type I multi-panel codebook, compared to type I single panel codebook, the PMI further comprises a phase for cross panel combination. For the Type II single panel codebook, the PMI is a linear combination of beams; it has a subset of orthogonal beams to be used for linear combination and has per layer, per polarization, amplitude and phase for each beam. For the PMI of any type, there can be wideband (WB) PMI and/or subband (SB) PMI as configured.

The CSI report configuration may configure the UE for aperiodic, periodic, or semi-persistent CSI reporting. For periodic CSI, the UE may be configured with periodic CSI-RS resources. Periodic CSI and semi-persistent CSI report on physical uplink control channel (PUCCH) may be triggered via RRC or a medium access control (MAC) control element (CE). For aperiodic and semi-persistent CSI on the physical uplink shared channel (PUSCH), the BS may signal the UE a CSI report trigger indicating for the UE to send a CSI report for one or more CSI-RS resources, by configuring the CSI-RS report trigger state. The CSI report trigger for aperiodic CSI and semi-persistent CSI on PUSCH may be provided via downlink control information (DCI). The CSI-RS trigger may be signaling indicating to the UE that CSI-RS will be transmitted for the CSI-RS resource.

The UE may report the CSI feedback based on the CSI report configuration and the CSI report trigger. For example, the UE may measure the channel associated with CSI for the triggered CSI-RS resources. Based on the measurements, the UE may select one or more preferred CSI-RS resources (e.g., the CSI-RS resources may be associated with different TRPs, different panels of a TRP) or select a CSI-RS resource comprising one or more port groups. The UE may report the CSI feedback for each of the CSI-RS resources and/or port groups.

In certain systems, a single codebook, provided with the CSI report configuration, is a common codebook that is applied to all of the NZP CSI-RS resources and the associated port groups configured for CM. However, for multi-TRP transmissions, such as NCJT transmission for example, it may desirable to have more than one codebook.

Accordingly, aspects of the present disclosure, a list of codebooks is provided with the CSI report configuration. The different codebooks may be different types of codebooks and/or may have different port configurations. Thus, the UE can determine a codebook from the list of codebooks to be applied to each CSI-RS resource and/or port group. The UE can evaluate the performance of the CSI-RS resources by applying the correct codebook to select the preferred CSI-RS resources. The UE then can determine the rank (e.g., RI), codeword (e.g., PMI), and CQI (calculated using the RI and PMI) for each of the selected CSI-RS resources and/or port groups. The UE can report CRI, indicating the selected CSI-RS resources, along with the RI, PMI, and CQI in the CSI report.

Figure 7:
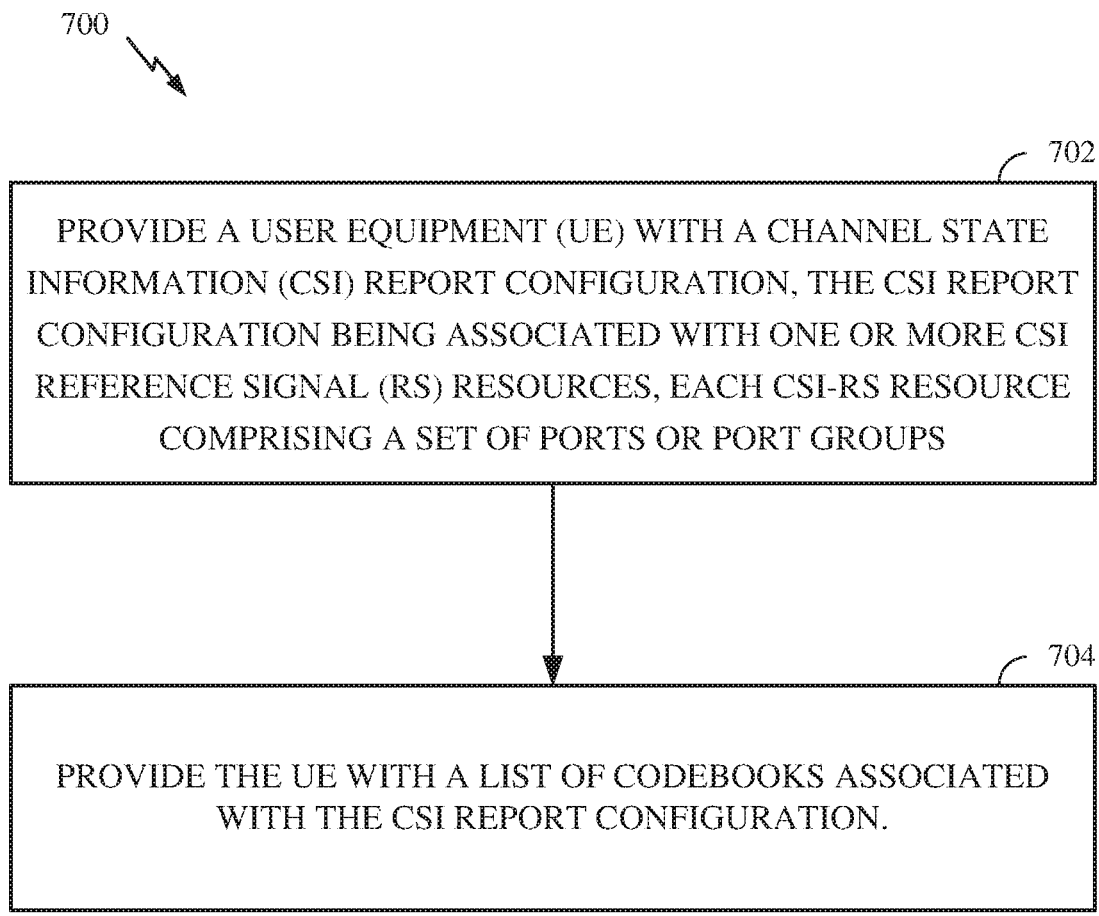
FIG. 7 is a flow diagram illustrating example operations for wireless communication by a BS, in accordance with certain aspects of the present disclosure.

FIG. 7 is a flow diagram illustrating example operations 700 for wireless communication, in accordance with certain aspects of the present disclosure. The operations 700 may be performed, for example, by a BS such as a BS 110 in the wireless communication network 100. At 702, the BS may provide a UE (e.g., a UE 120 in the wireless communication network 100) with a CSI report configuration. The CSI report configuration is associated with one or more CSI-RS resources. Each CSI-RS resource includes a set of ports or port groups. For example, the ports of the CSI-RS resource can be categorized in multiple port groups or in one port groups. If the ports of the CSI-RS resource are categorized into multiple port groups, the different port groups may correspond to different QCL (quasi-colocation) configurations. In some examples, each port group associated with a particular QCL configuration may correspond to a set of ports from a different TRP. In some examples, the ports for each CSI-RS resources may correspond to a set of ports from a different TRP. As mentioned above, the CSI-RS resources include at least one NZP CSI-RS resource for CM. Optionally, some of the CSI-RS resources may be configured for IM. Some of the CSI-RS resources may include multiple port groups. The CSI report configuration may be provided/configured via higher layer signaling, such as RRC signaling. The CSI report configuration may configure the UE for an aperiodic CSI report, a semi-persistent CSI report, or a periodic CSI report.

At 704, the BS provides the UE with a list of codebooks associated with the CSI report configuration. The list of codebooks may be associated with the NZP CSI-RS resources configured for CM. In some examples, the list of codebooks is provided as part of the CSI report configuration. The codebooks in the list may have different types, different port configurations, or different numbers of ports.

For example, the codebook may be a Type 1 single panel, a Type 1 multi-panel, a Type 2 single panel, or Type 2 multi-panel codebook. The port configuration may include a number of ports (e.g., 4, 8, 12, 16, 24, or 32 ports). The port configuration may include a Ni value with an oversampling value O1, and an N2 values with an oversampling value O2, that may be used to determine the 2D DFT codebook.

In some examples, the BS may provide an indication to the UE indicating, for each of the codebooks in the list, the associated CSI-RS resource or port group.

According to certain aspects, there is a one-to-one mapping between the codebooks in the list and the CSI-RS resources and/or port groups. The number of codebooks in the list is equal to the total number of CSI-RS resources and/or port groups in all of the CSI-RS resources in the CSI report configuration. In some examples, the CSI-RS resources are indexed and the list of codebooks are ordered according to the corresponding index of the associated CSI-RS resource. For example, the first CSI-RS resource is associated with the first codebook in the list; the second CSI-RS resource is associated with the second codebook in the list; and so on. In this case, the association of the codebooks to the CSI-RS resources and/or port groups can be determined without any additional signaling indicating the association.

According to certain aspects, each of the codebooks in the list has a same number of ports or a same number ports for a port group as one of the CSI-RS resources of the configured one or more CSI-RS resources. Thus, each CSI-RS resource and/or port group is associated with the codebook having the same number of ports. In this case, the association of the codebooks in the list to the CSI-RS resources and/or port groups can be determined based on the number of ports in the CSI-RS resource or port group (e.g., to a codebook in the list with the same number of ports). In an illustrative example, the CSI-RS resource configuration may configure 8 CSI-RS resources, some of the CSI-RS resources having 8 ports and some having 16 ports. In this case, the list may include only two codebooks-one codebook consisting of 8 ports and one codebook consisting of 16 ports. Then, the codebook to be applied can be determined based on the number of ports of a CSI-RS resource.

As discussed above, the CSI report configuration configures the quantities for the UE to report. For example, the CSI report configuration may configure the UE to report at least CRI, RI, PMI, and CQI. The BS may transmit CSI-RS to the UE according to the codebook. The BS may receive a CSI report from the UE including CRI indicating selected CSI-RS resources and including RI, PMI, and CQI for the selected CSI-RS resources using the associated codebook from the codebook list.

Figure 8:
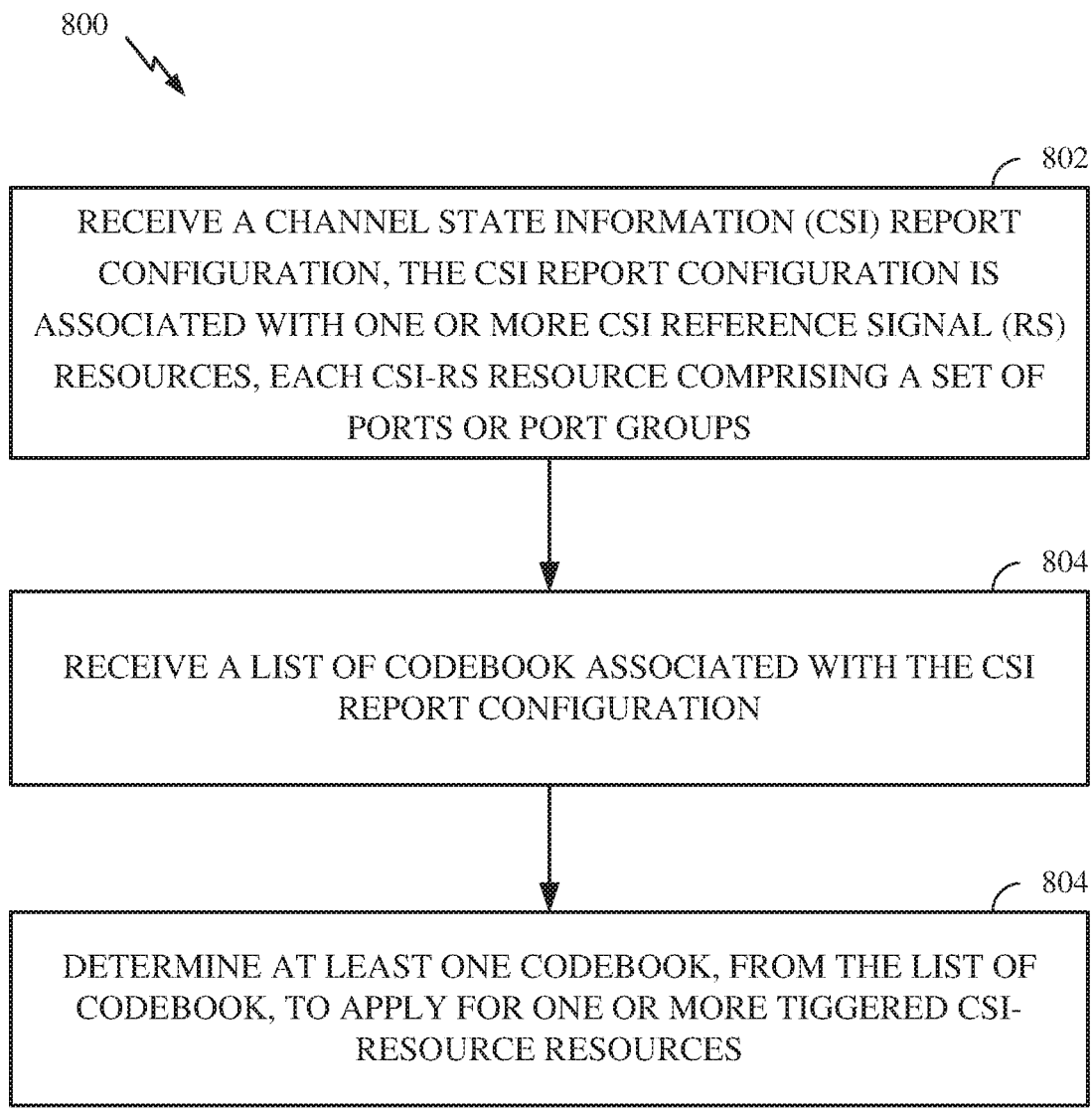
FIG. 8 is a flow diagram illustrating example operations for wireless communication by a UE, in accordance with certain aspects of the present disclosure.

FIG. 8 is a flow diagram illustrating example operations 800 for wireless communication, in accordance with certain aspects of the present disclosure. The operations 800 may be performed, for example, by a UE such as a UE 120 in the wireless communication network 100. The operations 800 may be complementary to the operations 700 performed by the BS. The operations 800 may begin, at 802, by receiving a CSI report configuration associated with one or more CSI-RS resources, each CSI-RS resource including a set of ports or port groups. At 804, the UE receives a list of codebooks associated with the CSI report configuration.

At 806, the UE determines at least one codebook, from the list of codebooks, to apply for one or more triggered CSI-RS resources. Applying the corresponding codebooks, the UE may measure the channel associated with the triggered CSI-RS resources. Based on the measurements, the UE may select one or more preferred CSI-RS resources. The UE may send a CSI report including CRI indicating the selected CSI-RS resources along with the PMI, RI, and CQI for the selected CSI-RS resources.

As discussed above, according to certain aspects the UE may determine the codebook to apply based on a one-to-one mapping of the CSI-RS resources to the codebooks. For example, the UE may determine the codebook in the list having an order corresponding to the index of the triggered CSI-RS resource or port group.

In an illustrative example of the codebook determination based on a one-to-one mapping, an aperiodic CSI report is configured by RRC. A resource set with 2 CSI-RS resources is configured. 2 codebooks are configured having different types and/or different port configurations. The aperiodic CSI report is triggered by a trigger state configured via downlink control information (DCI). Two CSI-RS resources are activated (e.g., triggered). For example, a first CSI-RS resource may have CSI-RS from a first TRP and a second CSI-RS resource has CSI-RS from a second TRP. In this case, the UE may apply the first codebook to the first CSI-RS resource and apply the second codebook to the second CSI-RS resource. The UE reports CRI if configured in the CSI report configuration, along with the corresponding CSI for the selected CSI-RS resource. For example, CRI=0 to indicate the first CSI-RS resource is selected, along with RI, PMI, and CQI using the first codebook; CRI=1 to indicate the second CSI-RS resource is selected, along with RI, PMI, and CQI using the second codebook; or CRI=2 to indicate the first and second CSI-RS resources are selected (e.g., in the case of NCJT), along with RI, PMI, and CQI using the first codebook for the first CSI-RS resource and the RI, PMI, and CQI using the second codebook for the second CSI-RS resource.

As discussed above, according to certain aspects the UE may select the codebook to apply having a same number of ports or a same number of ports for a port group as the triggered one or more CSI-RS resources.

In an illustrative example of the codebook determination based on number of ports for two configured CSI-RS resources, an aperiodic CSI report is configured by RRC. A resource set with 2 CSI-RS resources is configured. 2 codebooks are configured, a first codebook with 8 ports and a second codebook with 16 ports. The aperiodic CSI report is triggered by a trigger state configured via DCI. Two CSI-RS resources are activated (e.g., triggered), a first CSI-RS resource with 16 ports and a second CSI-RS resource with 8 ports. For example, the first CSI-RS resource may have CSI-RS from a first TRP and the second CSI-RS resource has CSI-RS from a second TRP. In this case, the UE may apply the first codebook (having 8 ports) to the second CSI-RS resource (also having 8 ports) and apply the second codebook (having 16 ports) to the first CSI-RS resource (also having 16 ports). The UE reports CRI if configured in the CSI report configuration, along with the corresponding CSI for the selected CSI-RS resource. For example, CRI=0 to indicate the first CSI-RS resource is selected, along with RI, PMI, and CQI using the second codebook; CRI=1 to indicate the second CSI-RS resource is selected, along with RI, PMI, and CQI using the first codebook; or CRI=2 to indicate the first and second CSI-RS resources are selected (e.g., in the case of NCJT), along with RI, PMI, and CQI using the second codebook for the first CSI-RS resource and the RI, PMI, and CQI using the first codebook for the second CSI-RS resource.

In another illustrative example of the codebook determination based on number of ports for three configured CSI- RS resources for mutli-TRP NCJT transmission, an aperiodic CSI report is configured by RRC. A resource set with 3 CSI-RS resources is configured. 2 codebooks are configured, a first codebook with 8 ports and a second codebook with 16 ports. A CSI report quantity associated with a multi-TRP transmission, such as a NCJT, may be configured. The aperiodic CSI report is triggered by a trigger state configured via DCI. Three CSI-RS resources are activated (e.g., triggered), a first CSI-RS resource with 16 ports and second and third CSI-RS resources with 8 ports. For example, the first CSI-RS resource may have CSI-RS from a first TRP, the second CSI-RS resource has CSI-RS from a second TRP, and the third CSI-RS resource may have CSI-RS from a third TRP. In this case, the UE may apply the first codebook (having 8 ports) to the second and third CSI-RS resources (also having 8 ports) and apply the second codebook (having 16 ports) to the first CSI-RS resource (also having 16 ports). The UE may select two of the three configured CSI-RS resources. The UE reports CRI if configured in the CSI report configuration, along with the corresponding CSI for the selected CSI-RS resource. For example, CRI=0 to indicate the first and second CSI-RS resources are selected, along with RI, PMI, and CQI for the first CSI-RS resource using the second codebook and RI, PMI, and CQI for the second and third CSI-RS resources using the first codebook; CRI=1 to indicate the first and third CSI-RS resources are selected, along with RI, PMI, and CQI for the first CSI-RS resource using the second codebook and RI, PMI, and CQI for the third CSI-RS resource using the first codebook; or CRI=2 to indicate the second and third CSI-RS resources are selected, along with RI, PMI, and CQI for the second and third CSI-RS resources using the first codebook.

In another illustrative example of the codebook determination based on number of ports for a CSI-RS resource with multiple port groups for NCJT transmission, an aperiodic CSI report is configured by RRC. A resource set with 2 CSI-RS resources is configured. 2 codebooks are configured, a first codebook with 8 ports and a second codebook with 16 ports. A CSI report quantity associated with a multi-TRP transmission, such as a NCJT, may be configured. The aperiodic CSI report is triggered by a trigger state configured via DCI. One CSI-RS resource may be activated (e.g., triggered), a first CSI-RS resource with one port group having 16 ports and a second port group with 8 ports. For example, the first port group may have CSI-RS from a first TRP and the second port group has CSI-RS from a second TRP. In this case, the UE may apply the first codebook (having 8 ports) to the second port group (also having 8 ports) and apply the second codebook (having 16 ports) to the first port group (also having 16 ports). The UE may select the CSI-RS resource with the two port groups. The UE reports CRI if configured in the CSI report configuration, along with the corresponding CSI for the two port groups. For example, the UE reports RI, PMI, and CQI for the first port group using the second codebook and RI, PMI, and CQI for the second port group using the first codebook.

Figure 9:
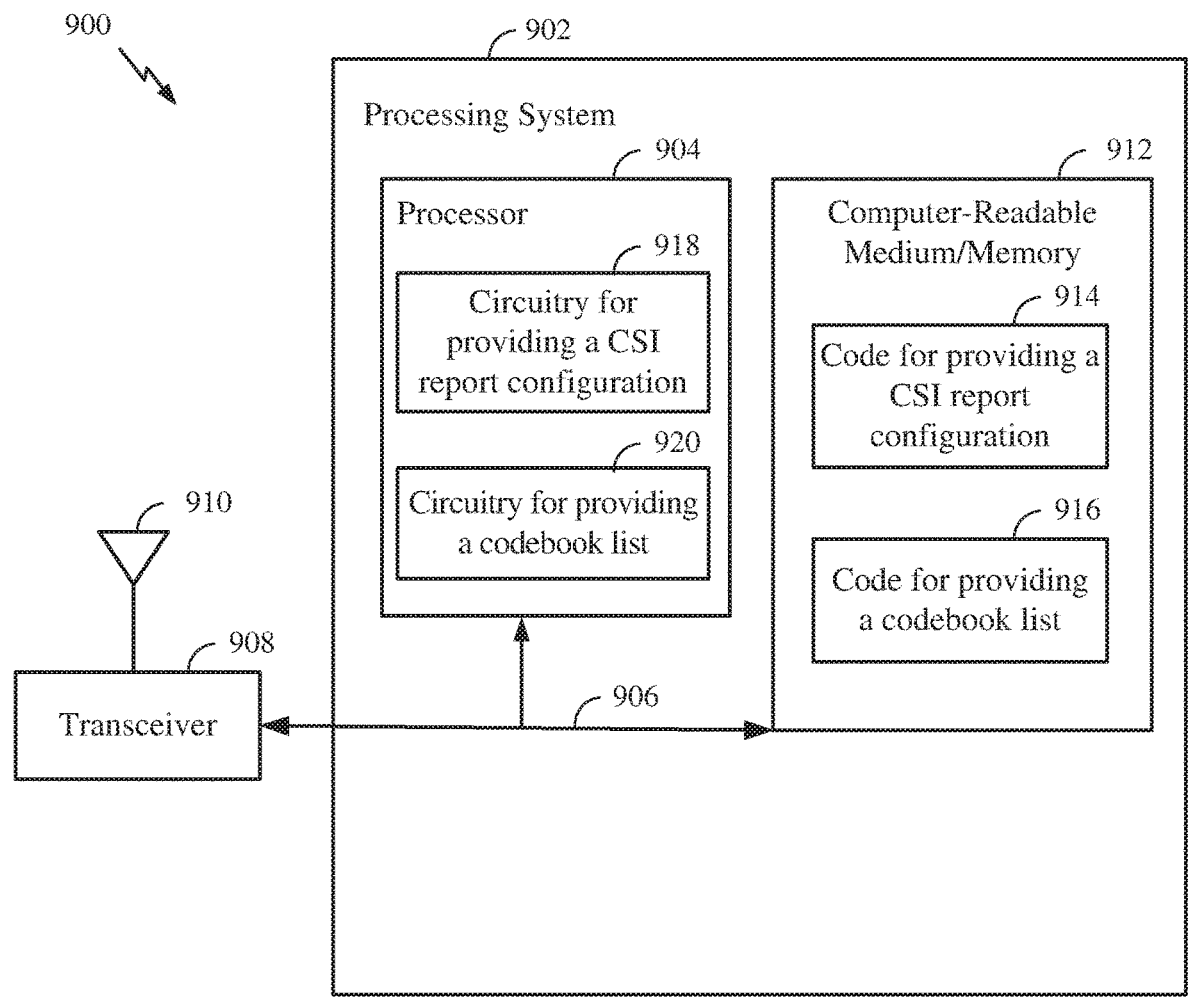
FIG. 9 illustrates a communications device that may include various components configured to perform operations for the techniques disclosed herein in accordance with aspects of the present disclosure.

FIG. 9 illustrates a communications device 900 that may include various components (e.g., corresponding to means-plus-function components) configured to perform operations for the techniques disclosed herein, such as the operations illustrated in FIG. 7. The communications device 900 includes a processing system 902 coupled to a transceiver 908. The transceiver 908 is configured to transmit and receive signals for the communications device 900 via an antenna 910, such as the various signals as described herein. The processing system 902 may be configured to perform processing functions for the communications device 900, including processing signals received and/or to be transmitted by the communications device 900.

The processing system 902 includes a processor 904 coupled to a computer-readable medium/memory 912 via a bus 906. In certain aspects, the computer-readable medium/memory 912 is configured to store instructions (e.g., computer executable code) that when executed by the processor 904, cause the processor 904 to perform the operations illustrated in FIG. 7, or other operations for performing the various techniques discussed herein for a codebook list for CSI report configuration. In certain aspects, computer-readable medium/memory 912 stores code 914 for providing a CSI report configuration and code 916 for providing a codebook list with the CSI report configuration. In certain aspects, the processor 904 has circuitry configured to implement the code stored in the computer-readable medium/memory 912. The processor 904 includes circuitry 918 for providing a CSI report configuration and code 920 for providing a codebook list with the CSI report configuration.

Figure 10:
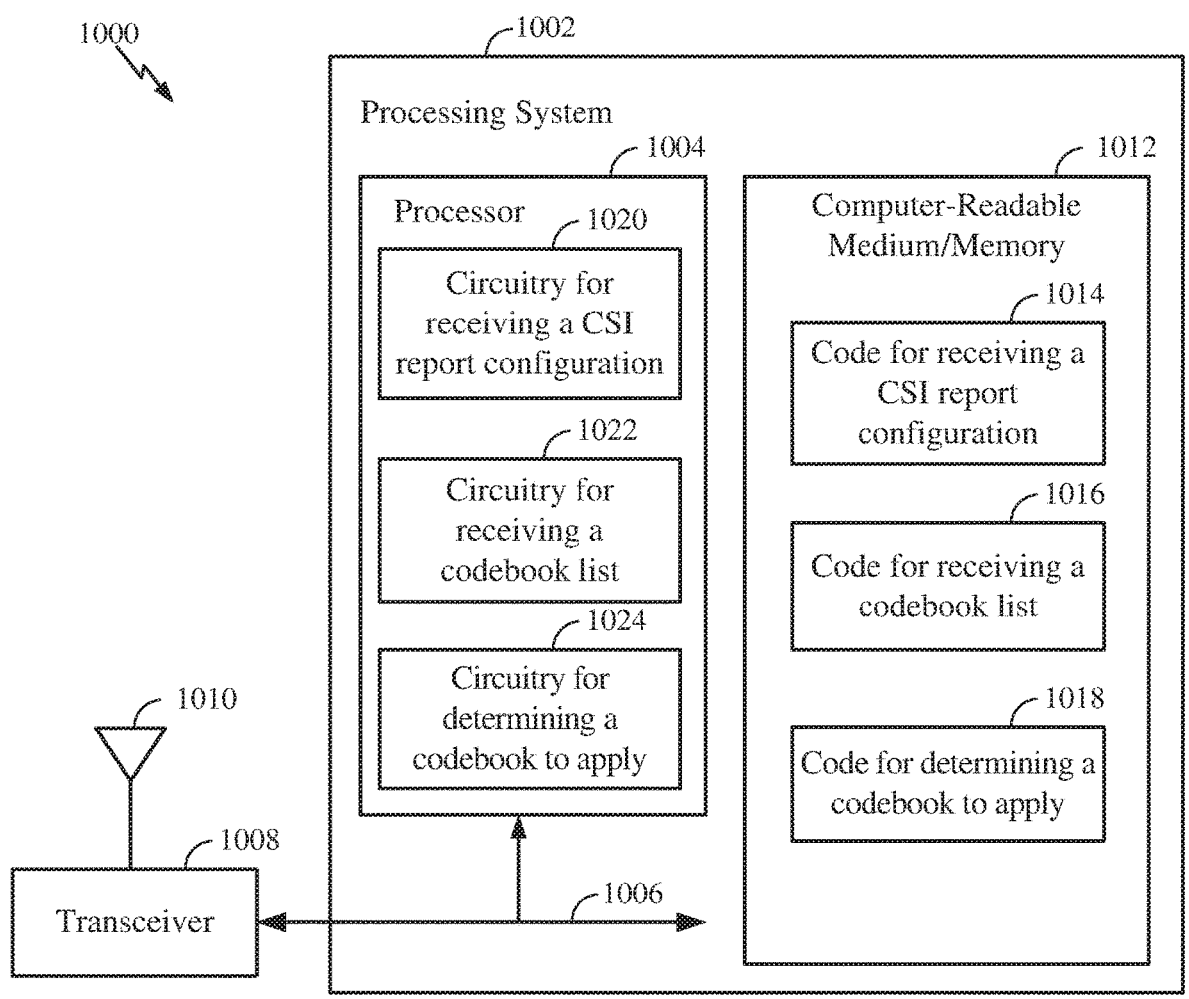
FIG. 10 illustrates a communications device that may include various components configured to perform operations for the techniques disclosed herein in accordance with aspects of the present disclosure.

FIG. 10 illustrates a communications device 1000 that may include various components (e.g., corresponding to means-plus-function components) configured to perform operations for the techniques disclosed herein, such as the operations illustrated in FIG. 8. The communications device 1000 includes a processing system 1002 coupled to a transceiver 1008. The transceiver 1008 is configured to transmit and receive signals for the communications device 1000 via an antenna 1010, such as the various signals as described herein. The processing system 1002 may be configured to perform processing functions for the communications device 1000, including processing signals received and/or to be transmitted by the communications device 1000.

The processing system 1002 includes a processor 1004 coupled to a computer-readable medium/memory 1012 via a bus 1006. In certain aspects, the computer-readable medium/memory 1012 is configured to store instructions (e.g., computer executable code) that when executed by the processor 1004, cause the processor 1004 to perform the operations illustrated in FIG. 8, or other operations for performing the various techniques discussed herein for a codebook list for a CSI report configuration. In certain aspects, computer-readable medium/memory 1012 stores code 1014 for receiving a CSI report configuration; code 1016 for receiving a codebook list with the CSI report configuration; and code 1018 for determining a codebook to apply for triggered CSI-RS resources. In certain aspects, the processor 1004 has circuitry configured to implement the code stored in the computer-readable medium/memory 1012. The processor 1004 includes circuitry 1020 for receiving a CSI report configuration; circuitry 1022 for receiving a codebook list with the CSI report configuration; and circuitry 1024 for determining a codebook to apply for triggered CSI-RS resources.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices. e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example RAM (Random Access Memory), flash memory. ROM (Read Only Memory), PROM (Programmable Read-Only Memory). EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIG. 7 and FIG. 8.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communication by a user equipment (UE), the method comprising:
receiving a channel state information (CSI) report configuration, wherein the CSI report configuration is associated with one or more CSI reference signal (CSI-RS) resources, each of the one or more CSI-RS resources comprising a set of ports or port groups, wherein the one or more CSI-RS resources or the set of ports or port groups are indexed;
receiving a list of a plurality of codebooks for the CSI report configuration, wherein each codebook of the plurality of codebooks is associated with a subset of the one or more CSI-RS resources, ports, or port groups of the CSI report configuration, and wherein the list of the plurality of codebooks is an ordered list; and
determining at least one codebook, from the list of the plurality of codebooks, to apply for one or more triggered CSI-RS resources of the one or more CSI-RS resources associated with the CSI report configuration, wherein the determining comprises determining, for each triggered CSI-RS resource of the one or more triggered CSI-RS resources, the codebook, in the list of codebooks, having an order corresponding to an index of the triggered CSI-RS resource.

2. The method of claim 1, wherein:
the one or more CSI-RS resources comprises one or more non-zero power (NZP) CSI-RS resources for channel measurement (CM); and
the list of the plurality of codebooks is associated with the one or more NZP CSI-RS resources for CM.

3. The method of claim 1, wherein a number of the codebooks in the list of the plurality of codebooks is equal to a total number of the one or more CSI-RS resources or a total number of the port groups in the CSI report configuration.

4. A method for wireless communication by a user equipment (UE), the method comprising:
receiving a channel state information (CSI) report configuration, wherein the CSI report configuration is associated with one or more CSI reference signal (CSI-RS) resources, each of the one or more CSI-RS resources comprising a set of ports or port groups;
receiving a list of a plurality of codebooks for the CSI report configuration, wherein each codebook of the plurality of codebooks is associated with a subset of the one or more CSI-RS resources, ports, or port groups of the CSI report configuration, and wherein the codebooks in the list of the plurality of codebooks comprise codebooks having at least one of: different codebook types, different port configurations, or different numbers of ports; and
selecting, for each triggered CSI-RS of the one or more triggered CSI-RS resources, the codebook, in the list of codebooks, having a same number of ports or a same number of ports for a port group as the triggered CSI-RS resource.

5. The method of claim 1, wherein the CSI report configuration is received via radio resource control (RRC) signaling.

6. The method of claim 1, wherein the CSI report configuration configures the UE for at least one of: an aperiodic CSI report, a periodic CSI report, or a semi-persistent CSI report.

7. The method of claim 1, wherein the CSI report configuration configures the UE to report at least one of: a CSI resource indicator (CRI), a rank indicator (RI), a precoding matrix indicator (PMI), or a channel quality indicator (CQI).

8. The method of claim 7, further comprising:
receiving one or more CSI-RS on the one or more triggered CSI-RS resources;
measuring the ports associated with the one or more triggered CSI-RS resources;
selecting one or more preferred CSI-RS resources based on the measurements; and
transmitting a CSI report including CRI indicating the selected one or more preferred CSI-RS resources and including RI, PMI, and CQI for the selected one or more preferred CSI-RS resources using the determined at least one codebook from the list of the plurality of codebooks.

9. A method for wireless communication by a base station (BS), the method comprising:
providing a user equipment (UE) with a channel state information (CSI) report configuration, the CSI report configuration being associated with one or more CSI reference signal (CSI-RS) resources, each of the one or more CSI-RS resources comprising a set of ports or port groups, wherein the one or more CSI-RS resources or the set of ports or port groups are indexed; and
providing the UE with a list of a plurality of codebooks for the CSI report configuration, wherein each codebook of the plurality of codebooks is associated with a subset of the one or more CSI-RS resources, ports, or port groups of the CSI report configuration, wherein the list of the plurality of codebooks is an ordered list, and wherein each codebook in the list has an order corresponding to an index of one of the one or more CSI-RS resources.

10. The method of claim 9, wherein:
the one or more CSI-RS resources comprises one or more non-zero power (NZP) CSI-RS resources for channel measurement (CM); and
the list of the plurality of codebooks is associated with the one or more NZP CSI-RS resources for CM.

11. The method of claim 9, wherein a number of the codebooks in the list of the plurality of codebooks is equal to a total number of the one or more CSI-RS resources or a total number of the port groups in all of the one or more CSI-RS resources in the CSI report configuration.

12. A method for wireless communication by a base station (BS), the method comprising:
providing a user equipment (UE) with a channel state information (CSI) report configuration, the CSI report configuration being associated with one or more CSI reference signal (CSI-RS) resources, each of the one or more CSI-RS resources comprising a set of ports or port groups; and
providing the UE with a list of a plurality of codebooks for the CSI report configuration, wherein each codebook of the plurality of codebooks is associated with a subset of the one or more CSI-RS resources, ports, or port groups of the CSI report configuration, wherein the codebooks in the list of the plurality of codebooks comprises codebooks having at least one of:
different codebook types, different port configurations, or different numbers of ports, and wherein each of the codebooks in the list of the plurality of codebooks has a same number of ports or a same number ports for a port group as a CSI-RS resource of the one or more CSI-RS resources in the CSI report configuration.

13. The method of claim 9, wherein the CSI report configuration is provided via radio resource control (RRC) signaling.

14. The method of claim 9, wherein the CSI report configuration configures the UE for at least one of: an aperiodic CSI report, a semi-persistent CSI report, or a periodic CSI report.

15. The method of claim 9, wherein the CSI report configuration configures the UE to report at least one of: a CSI resource indicator (CRI), a rank indicator (RI), a precoding matrix indicator (PMI), or a channel quality indicator (CQI).

16. The method of claim 15, further comprising receiving a CSI report from the UE including CRI indicating selected CSI-RS resources and including RI, PMI, and CQI for the selected CSI-RS resources using the associated codebook from the list of the plurality of codebooks.

17. The method of claim 1, wherein a first CSI-RS resource of the one or more triggered CSI-RS resources is associated with a first transmit-receive point (TRP) and a second CSI-RS resource of the one or more triggered CSI-RS resources is associated with a second TRP.

18. The method of claim 17, wherein the determining the at least one codebook from the list of the plurality of codebooks comprises determining a first codebook for the first CSI-RS resource and a second codebook for the second CSI-RS resource.

* * * * *